March 1, 1960     S. A. H. SCHMAUS     2,926,685
FLOAT OPERATED AIR VOLUME REGULATOR
Filed Nov. 9, 1956     3 Sheets-Sheet 1
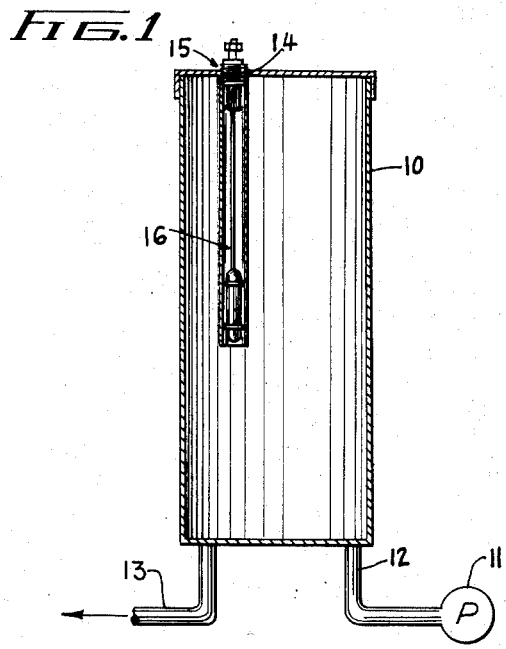
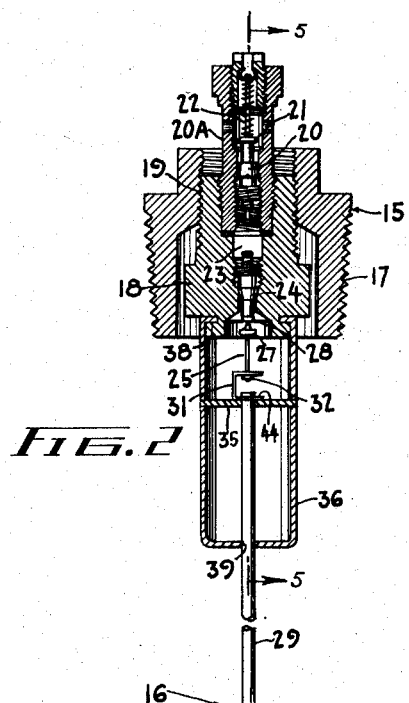
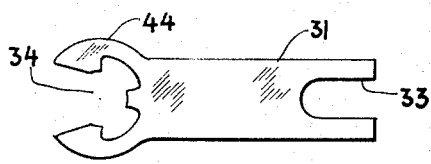
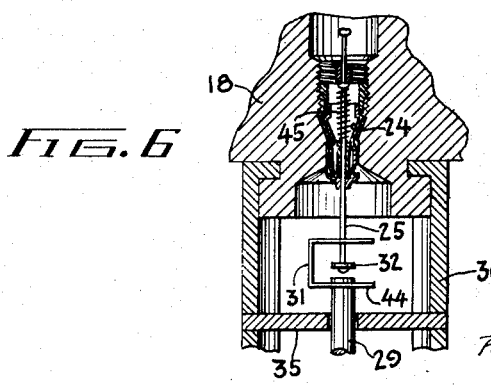
INVENTOR.
Siegfried A. H. Schmaus
BY
Pollard Johnston Smyth & Robertson
ATTORNEYS March 1, 1960 S. A. H. SCHMAUS 2,926,685
FLOAT OPERATED AIR VOLUME REGULATOR
Filed Nov. 9, 1956 3 Sheets-Sheet 2

INVENTOR.
Siegfried A. H. Schmaus
BY
ATTORNEYS

March 1, 1960 S. A. H. SCHMAUS 2,926,685
FLOAT OPERATED AIR VOLUME REGULATOR
Filed Nov. 9, 1956 3 Sheets-Sheet 3

WATER IN

INVENTOR
Siegfried A. H. Schmaus
BY
ATTORNEYS

2,926,685

FLOAT OPERATED AIR VOLUME REGULATOR

Siegfried A. H. Schmaus, Philadelphia, Pa., assignor to American Machine and Metals, Inc., New York, N. Y., a corporation of Delaware Application November 9, 1956, Serial No. 621,417

2 Claims. (Cl. 137—202)

This invention relates to an air volume regulator adapted for use in conjunction with pressure water supply systems.

In domestic water supply systems having a pressure tank fillable with water from a well by means of a pump, air is trapped in the tank over the liquid level and is compressed therein to a predetermined pressure so as to provide energy for causing water to flow from various outlets or spigots of the system as needed. It is necessary in some instances to place the tank underground because of freezing conditions, and it is desirable to be able to position the valve regulator as needed by lowering or adjusting for the best operation.

One of the objects of the invention is to provide an air volume regulator device which can be assembled and disassembled with ease.

Another object of the invention is to provide an air volume regulator arrangement which can be used in tanks of varying depths.

Another object of the invention is to provide an air volume regulator adapted for use in buried tanks having a restricted opening for receiving the deep well pump assembly which extends below the tank and wherein the water level may differ for the various installations.

In one aspect of the invention, the storage tank can have an aperture therein, the aperture being adapted to receive a support means or regulator body which carries the pressure control valves and the float. Two relief valves are employed, the valves being in series between a passage connected to the interior of the tank and a passage to the exterior. The valves may be mounted in a sub-assembly insertable in the regulator body. The outermost valve preferably is of a pressure relief type such as a conventional tire valve. The interior valve also may be a similar spring loaded type of valve, the stem thereof being connected to the float through a disengageable link means loosely connecting the parts through a float stem. The disengageable link may have a slot slidable over the shank of the second valve stem and loosely connected thereto. In operation, when the float rises with increasing water level, after the spring-loaded valve has been closed by its spring, further travel of the float is permitted without any strain being placed on the valve stem. The float rod can be arranged to close positively the second valve. A cage, including a guide for the valve stem, can be arranged to be attached to the regulator body or support, said cage being formed from a flat strip of metal, a crosspiece being inserted therein having an aperture for guiding the float operated stem.

In a further aspect of the invention, the regulator body is insertable in the aperture of the tank or an extension thereof so that its height can be adjusted in accordance with the tank. Such is useful particularly when the tank is arranged to be buried in the ground and a connection or opening is needed to receive the regulator and through which the pump and its submerged motor can be inserted.

These and other objects, advantages and features of the invention will become apparent from the following description and drawings, which are merely exemplary.

Fig. 1 is a schematic view of one manner of use of the invention;

Fig. 2 is an enlarged view of the device, a portion being in section and a portion being broken;

Fig. 3 is a view of the connecting link before it is bent into its final shape;

Fig. 6 is a fragmentary section view showing connection between the float rod and the second valve before the float rod has positively contacted the valve stem;

Figure 4:
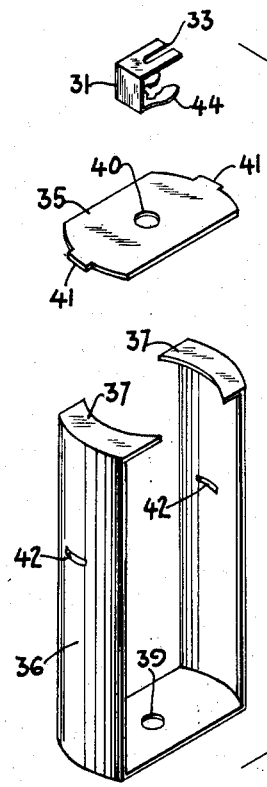
Fig. 4 is an exploded view of the guide cage and the bent connecting link.

The invention will first be described in conjunction with a tank where it is inserted in an aperture in the top thereof, such being schematically illustrated as in Fig. 1. Tank 10 may have pump 11 connected to inlet pipe 12 for supplying water thereto, the pump being controlled by the usual pressure switch (not shown), the outlet from the tank being through pipe 13. Aperture 14 in the top of tank 10 can be threaded to receive screw-threaded regulator body 15, said body having float assembly 16 and its related valves carried thereby as will be described later.

Referring to Fig. 2, regulator body 15 has exterior threads 17 for screw-threaded engagement with aperture 14 in the tank. The regulator valve assembly carrier or body 18 is screw-threadedly engaged at 19 with regulator body 15. Regulator valve assembly body 18 may have a subassembly plug 20A in which relief valve 20 is screw-threadedly engaged. The valve may be, for example, a conventional type tire valve arranged so that valve plate or disc 21 thereof will open against the closing force of spring 22 when pressure in chamber 23 exceeds a predetermined amount, chamber 23 being opened to pressure in the tank 10 when the water level is sufficiently low to open valve 24. Float control relief valve 24 is screw-threadedly engaged in the regulator valve assembly body 18, the valve having a cooperating stem 25 for operation by float 26, the valve plate 27 being engageable with valve seat 28 in the usual manner. Float 26 can be connected to float operated stem 29, stem 29 having an annular groove at 30 for receiving one of the legs of C-shaped connecting link 31. Valve stem 25 has an enlargement or abutment at 32 for cooperating with one of the legs of link 31.

Link 31 preferably is made from sheet metal with a slot or notch 33 at the upper end thereof through which valve stem 25 passes, the width of slot 33 being made such that it is less than the outer dimension of abutment 32. The other leg or end of link 31 has a notch or aperture 34 cut therein for slipping onto the annular groove 30 in float stem 29 and retaining the same thereon. Float stem 29 may be guided in its movement by guide means 35, said guide means being held by bracket or cage 36. Bracket or cage 36 may be made from a flat piece of metal bent as seen in Fig. 4, said bracket having inturned ears 37 for engaging the annular groove 38 adjacent the bottom of regulator valve assembly body 18. Float operated stem 29 passes through aperture 39 in the bottom of the bracket, and guide 35 can have an aperture 40 therein through which float stem 29 passes. Flat stem 29 is thus guided by both bracket 36 and guide 35. The guide 35 may have wings or extensions 41 engageable in apertures 42 of bracket 36. The guide may be fastened to the cage 36 by soldering or the wings may be made sufficiently long to be bent over so as to hold the parts in assembled relationship. The connecting link, together with the cage and guide, is illustrated in Fig. 4.

In assembly, it should be apparent that notch 33 of connecting link 31 can be slipped onto valve stem 25 and notch 34 can be engaged in groove 30 of the float stem 29.

When the device is in place with the water at a low level in the tank, float 26 will cause float stem 29 to be in its lower position as illustrated in Fig. 2, the lower leg 44 of the connecting link 31 resting on top of guide 35 which will serve to prevent strain being transmitted to valve 24. As water level rises, float stem 29 will move upwardly so as to permit spring 45 (Fig. 6) of the relief valve 24 to close the valve. As water level continues to rise, the top of float stem 29 will come into contact with the relief valve stem 25 (Fig. 6) so as to close relief valve 24 positively.

Figure 5:
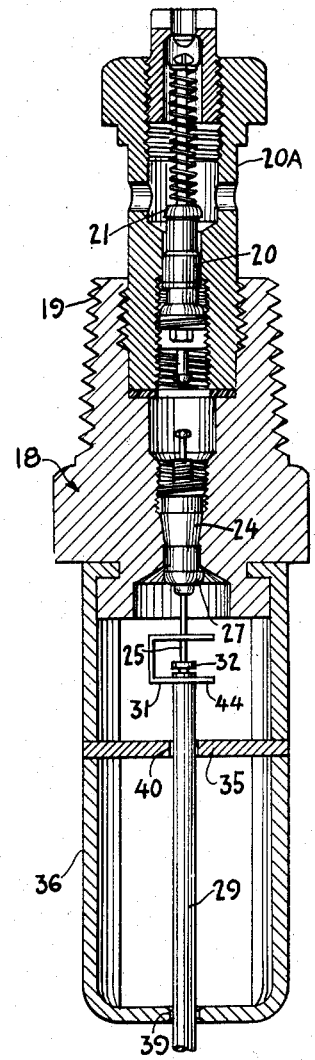
Fig. 5 is an enlarged view of a modified form of supporting body.
Figure 7:
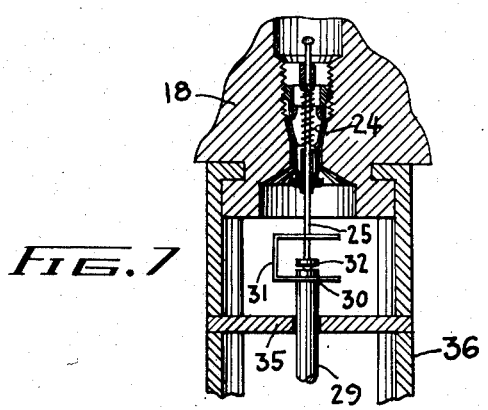
Fig. 7 is a view showing the float rod in contact with the valve stem.

If it is desired to employ the regulator for use with a tank to be placed or buried in the ground, such a tank having a relatively long neck leading thereto, a support or regulator body 50 such as illustrated in Fig. 5 may be used. The various parts in Fig. 5 that are similar to those of Fig. 2 have been given the same reference characters.

Figure 8:
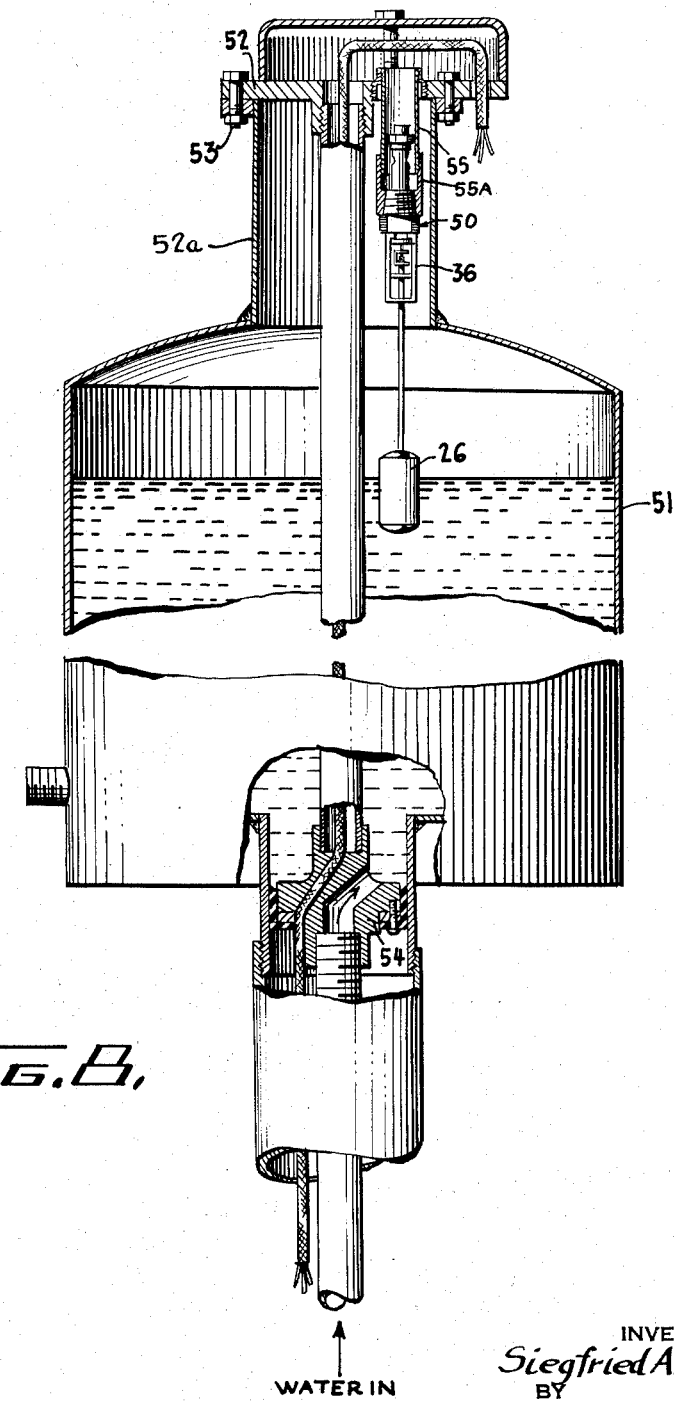
Fig. 8 is a view of a tank containing the air volume regulator of the invention.

Referring to Fig. 8, tank 51 has an extension or neck 52a arranged so that the tank can be placed the desired distance underground. Among the purposes for placing the tank underground is the prevention of freezing and sealing access thereto. Cap 52 can be suitably fastened to neck portion 52a by bolts 53. The neck extension 52a may be made sufficiently large so that the pump, motor and related parts connected to flange 54 can be removed therethrough when desired. In order to adjust the position of the volume regulator, pipe nipple 55 can be screw-threadedly engaged in cap 52. The regulator body housing 50 then can be screw-threadedly engaged in the interiorly threaded portion of coupling 55a, the position thereof being adjustable. Also, the nipple 55 can be cut to the desired length. In this manner, the position of the float relative to the tank can be adjusted.

It should be apparent from the above, that the loose connecting link provides for overtravel, eliminates the possibility of the weight of the float damaging the valve and permits the valve to seat properly. The valve can be removed easily by unclipping link 31 therefrom or by unscrewing valve 24 and rocking it slightly. The free riding float will take care of any misalignment, and the regulator can be adjusted as needed. Details of construction, of course, can be varied without departing from the spirit of the invention except as defined in the appended claims.

What is claimed is:

1. An air volume control for use in conjunction with a storage tank having an aperture, the combination including support means having a passage therethrough, a first spring loaded pressure relief valve in the passage through said support means and having means openable at a predetermined pressure, a second spring loaded relief valve in said passage in series with said first valve and below said first valve, said second valve having an operating stem with an abutment thereon, water level responsive float means, and C-shaped link means connected at one leg to said float means and having slot means in the other leg through which said stem passes, the edges of said slot means engaging said abutment when the float means falls to open the second valve, said link means being movable in an overtravel direction relative to said stem after the second valve has closed.

2. An air volume control for use in conjunction with a storage tank having an aperture therein, the combination including a regulator valve assembly body, relief valve means mounted in said body, said relief valve means having a stem with an abutment, a float, a float operated stem connected to said float, a bracket cage mounted on said body, said cage having an operating stem guide aperture therein, and link means within said cage connecting said float stem to said relief valve means, said link means having a slot therein slippable over said relief valve means stem and having a loose fit relative thereto, the margins of said slot cooperating with said abutment for operating said valve means, guide means in said cage spaced from said guide aperture and located between said guide aperture and said link means, said guide means having an opening therein through which said operating stem passes, so that said opening and said aperture act to prevent rocking movement of said operating stem.

References Cited in the file of this patent

UNITED STATES PATENTS

| | | |
|---|---|---|
| 925,859 | Axford | June 22, 1909 |
| 1,648,756 | Cherry | Nov. 8, 1927 |
| 1,657,112 | Doughty | Jan. 24, 1928 |
| 2,179,688 | Doughty | Nov. 14, 1939 |
| 2,633,142 | Woolley | Mar. 31, 1953 |